Figure 1:
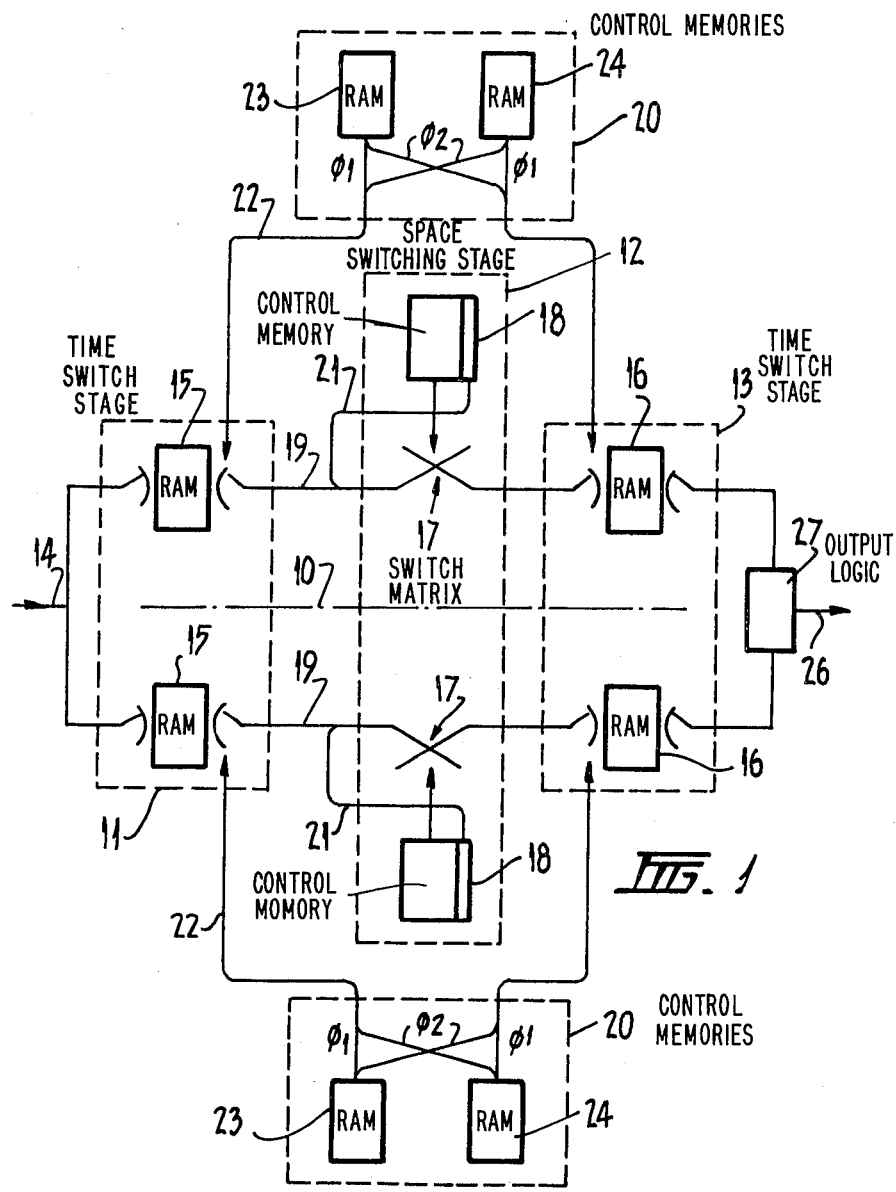

United States Patent [19]

Valastro et al.

[11] 4,081,610

[45] Mar. 28, 1978

[54] FAST ACCESS ANTIPHASE CONTROL MEMORY FOR DIGITAL DATA SWITCHES

[75] Inventors: Bartolo Valastro, Pascoe Vale; Franko Stipcevic, Glenroy, both of Australia

[73] Assignee: L.M. Ericsson Pty. Ltd., Australia

[21] Appl. No.: 558,360

[22] Filed: Mar. 14, 1975

[30] Foreign Application Priority Data

Mar. 15, 1974 Australia ............................. PB6928

[51] Int. Cl.² .............................................. H04J 3/00
[52] U.S. Cl. .............................................. 179/15 AT
[58] Field of Search ........... 179/15 AT, 15 A, 15 AQ

[56] References Cited

U.S. PATENT DOCUMENTS

| | | |
|---|---|---|
| 3,761,894 | 9/1973 | Pilc et al. .................... 179/15 AQ X |
| 3,851,105 | 11/1974 | Regnier et al. ................. 179/15 AT |
| 3,867,579 | 2/1975 | Colton et al. ....................... 179/15 A |
| 3,878,338 | 4/1975 | Hardy .............................. 179/15 AT |
| 3,894,189 | 7/1975 | Edstrom et al. ................ 179/15 AT |
| 3,920,914 | 11/1975 | Regnier et al. .................. 179/15 AT |
| 3,927,267 | 12/1975 | Voyer et al. ..................... 179/15 AT |

*Primary Examiner*—Thomas W. Brown
*Attorney, Agent, or Firm*—Cushman, Darby & Cushman

[57] ABSTRACT

The disclosure describes a control memory for addressing inlet and outlet switching stages of a three stage digital switch. The control memory comprises two identical random access memories (RAM's) each having an address storage capacity equal to half the number of simplex connections which can be made through either stage of the switch. The arrangement described allows a large saving in the number of memory bits necessary to address the inlet and outlet switching stages and enables fast access of the control memory for the purpose of establishing or terminating connections.

6 Claims, 2 Drawing Figures

FAST ACCESS ANTIPHASE CONTROL MEMORY FOR DIGITAL DATA SWITCHES

This invention relates to a control memory and more particularly to a control memory suitable for use in telephone or data systems to address two or more individual data memories, which data memories require the same addresses at different times during a cycle of the system.

An obvious way to provide such control is to arrange a separate control memory for each data memory, each control memory having an address storage capability equal to the number of locations of its respective data memory. However such an arrangement is inefficient because each control memory stores the same data. Of course in the case of two data memories a single control memory could be used to supply the same address to each of the data memories during respective halves of a timing pulse cycle but in this case a problem arises because it is necessary to provide some time slots for writing into the control memory and then not all time slots can be used for transmitting data. Also the average time required to operate on a control memory location depends on the number and distribution of time slots allocated for that purpose.

One known arrangement for avoiding duplication of control memories utilizes the anti-phase principle and provides a shift register wherein the addresses of each location of the data memories are continually circulated. By connecting one end of the shift register to one data memory, and some point along the length of the shift register to the other data memory, the same address is sent to each data memory at different times. However, it is only possible to access the addresses in the shift register when they appear at the output and therefore writing into a particular location can only occur once during a cycle of the shift register. Consequently access time for a location is much greater than would be the case if random access were possible. Furthermore, noise on the clock pulse connection to the shift register can cause loss of synchronism and relatively complex circuitry is necessary to avoid this disadvantage. It is therefore an object of this invention to provide a control memory which obviates one or more of the abovementioned disadvantages.

According to the invention there is provided a control memory for addressing incoming and outgoing data switching stages of a digital data switch, said control memory including a pair of RAM's each having an address storage capability equal to half the maximum number of simplex connections which can be made through either stage of the switch, said RAM's being adapted to simultaneously provide an address for said switching stages, the address from each RAM being switched to the incoming and outgoing switching stages at respective times during a cycle of the switching stages and each RAM addressing a different one of said switching stages at any one time.

Figure 2:
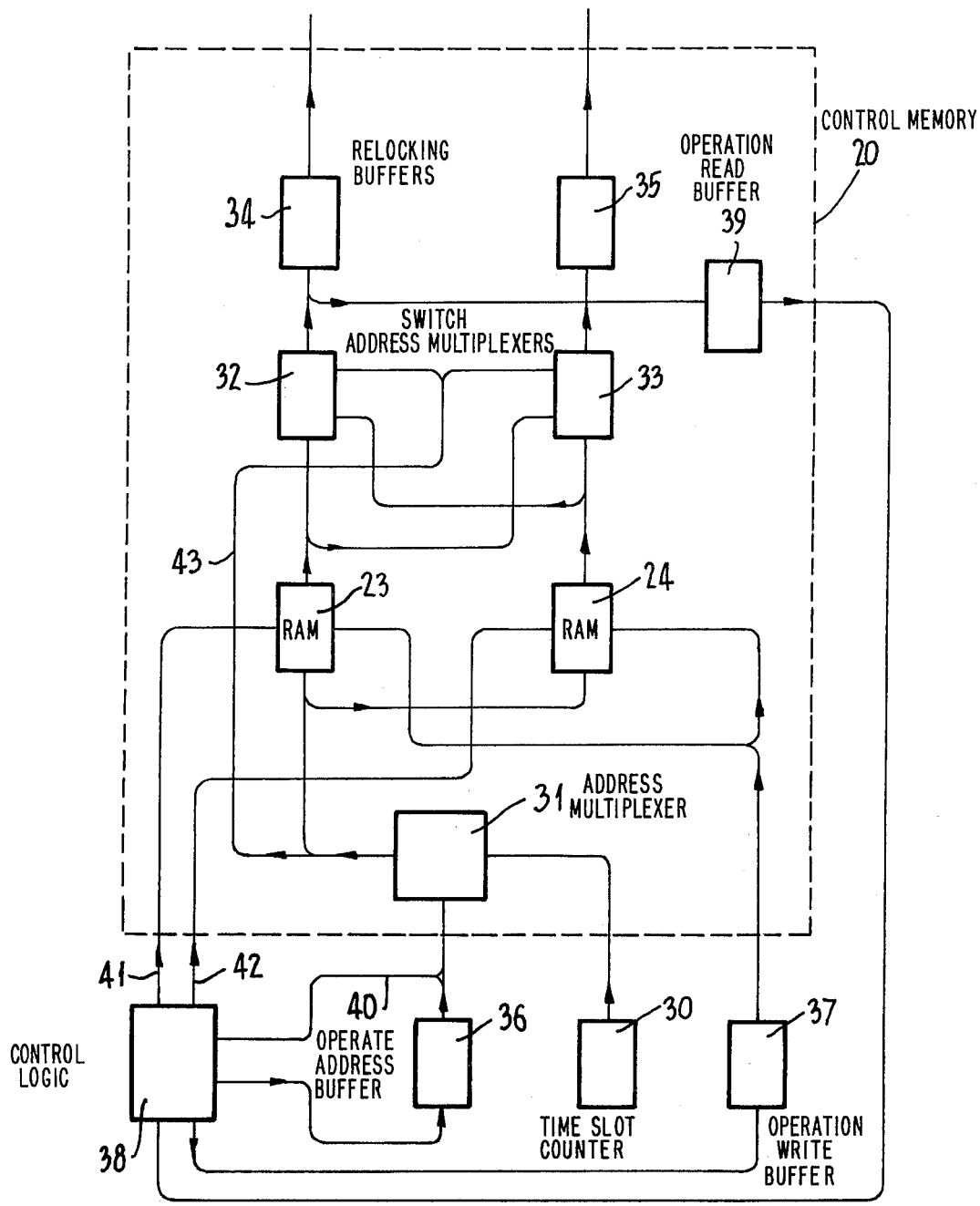

In order that the invention may be more readily understood one particular embodiment will now be described with reference to the accompanying drawing wherein FIG. 1 is a schematic block diagram of one group or section of a digital switch incorporating a control memory according to one embodiment of the invention and FIG. 2 is a more detailed circuit block diagram of the control memory of FIG. 1.

The digital switch of FIG. 1 is for PCM speech data and is suitable for use in a digital telephone exchange. The diagram of FIG. 1 is of one group or section of the switch which comprises, in all, 32 similar groups.

The group shown in FIG. 1 is divided into two identical planes being indicated above and below the broken line 10. Like reference numerals will be used to designate identical integers of the two planes.

The switch is of the TST type, that is, there are three stages of switching, the first stage 11 being time switching, the second stage 12 being space switching enabling a connection to be made to another group of the switch and the third stage 13 being time switching.

Incoming speech samples, in the form of parallel 8 bit PCM data enter the switch on connection 14 and are written sequentially into incoming speech memories 15 in each plane (only one direction of transmission considered). Each memory 15 is a 512 × 9 bit RAM (8 bit word, 1 bit parity) and there are enough memory cells or locations in the memories to provide duplicated set up for all calls. In other words, with 512 incoming channels to the group there is a dedicated location in each memory 15, for each incoming channel. Similarly, an outgoing speech memory 16 in each plane is a 512 word RAM which provides a dedicated location for each outgoing channel of the group.

The space switching stage 12 comprises a matrix switch 17 and a control memory 18 in each plane. The control memory 18 provides the address to the matrix switch 17. The matrix switch 17 comprises ten 32 input multiplexers (not shown) that is, each multiplexer has an input from the output 19 of one speech memory 15 of each of the 32 groups constituting the switch, and there are ten multiplexers because the output 19 from the memory 15 is 9 bits of parallel data (8 bits plus parity), and a further bit is added on connection 21 as described below.

As mentioned above incoming data is written sequentially into the memories 15. Data is read from the memories 15 under the control of control memories 20 and connection 22. The memories 20 also control the writing of data into the outgoing speech memories 16. The control memories 20 comprise two 256 word RAM's 23 and 24 which supply the appropriate addresses to the memories 15 and 16.

The working of the control memory 20 is divided into two phases. These are known as the read phase and operate phase and occur respectively whilst a 4 MHz clock for the system is high and whilst the 4MHz clock is low. The phases are of equal duration. It is during the read phase that the control memory contents are read cyclically for the purpose of presenting address data to the speech memories 15 and 16. The purpose of the operate phase is to enable reading or modification of address data contained in the control memories in order to terminate existing connections, enable new connections or perform maintenance tests.

Reference should now be made to FIG. 2 which is a more detailed circuit block diagram of one of the control memories 20. It also shows other hardware associated with the functioning of the control memory 20. The RAM's 23 & 24 each consist of 256 words of memory each word being 10 bits wide. Nine bits of each word being address data for speech memories 15 and 16 and one bit being a parity bit.

(a) Operation during Read Phase

A time slot counter 30 is clocked by the 4 MHz clock and supplies sequential nine bit addresses to the control memory 20. During the read phase the 8 least significant bits of this address are supplied to RAM's 23 and 24 via a read/operate address multiplexer 31 whilst 4MHz clock is high. The address is then used to read both RAM's 23 and 24 simultaneously. The data read from each RAM is presented to switch address multiplexers 32 and 33. Note that since only the eight least significant bits of the time slot counter 30 are used in reading the control memory 20, each location in RAM's 23 and 24 will be read twice during the counter 30 cycle time (125µs). The most significant bit of the time slot counter address is used to control multiplexers 32 and 33 via connection 43 and determines which RAM output data is switched through each multiplexing stages 32 and 33. When the most significant bit of the time slot counter 30 is low, data from RAM 23 is directed to speech memory 15 and data from RAM 24 to speech memory 16. When the most significant bit from counter 30 is high, address data previously directed to speech memory 15 is directed to speech memory 16 and that previously going to speech memory 16 is directed to speech memory 15. Hence we have antiphase operation of the control memory. It should be noted that address information from the control memory 20 is supplied to the speech memories 15 and 16 via reclocking buffers 34 and 35, respectively. The purpose of the buffers is to extend the duration of the cyclic switch addresses to a full 4MHz period; otherwise, the addresses would change during the operate phase.

(b) Operating During the Operate Phase

During the operate phase it is possible to write into or read from the control memory 20. The address of the control memory location to be operated on is stored in an operate address buffer 36.

If a write operation is to be performed, the data to be written is stored in an operation write buffer 37, and the data to be written is presented to the RAM's 23 and 24 via this buffer 37. The nine bit address from the operate address buffer 36 is presented to the multiplexing stage 31 and when the 4 MHz clock is low the eight least significant bits are presented to RAM's 23 and 24 and the most significant operate address bit is taken to multiplexing stages 32 and 33 on connection 43. The most significant operate address bit is also taken to a control logic unit 38 on connection 40. The control logic 38 uses this most significant bit to determine whether the data is to be written into RAM 23 or RAM 24. If the most significant bit of the operate address is low, a write enable pulse on connection 41 is applied and data is written into RAM 23. If the most significant bit is high, a write enable pulse on connection 42 is applied, and the data is written into RAM 24.

If a read operation is to be performed, the address of the control memory location to be read is loaded into the operate address buffer 36. The eight least significant bits of the address are presented to RAM's 23 and 24 via multiplexer 31 during the period that 4MHz clock is low (operate phase). Thus the location specified is read simultaneously from RAM's 23 and 24. The most significant bit from the operate address buffer 36 appears on connection 43 and is used to determine which of the two locations read is the one required. This is done by using the most significant bit to control the address multiplexer 32, thus selecting data from RAM 23 or 24. This data appears at the output of address multiplexer 32 and is clocked into the operation read buffer 39. The function of buffer 39 is to extend the duration of the data read to at least one 4MHz period, thereby giving the control logic Unit 38 sufficient time to access the data read.

It should be apparent from the above that during the count 0–255 of the nine bit time slot counter 30, the output of the respective RAM's is transmitted on connection $\phi_1$, (FIG. 1) whereas alteration of the most significant bit of the address from the counter 30 causes the address from the RAM's to go via connection $\phi_2$, that is, during the count 256–511, $\phi_2$ has the RAM output. Consequently, for an inter-group connection only one of the two RAM's of each control memory 20 of each group is used for the connection, the RAM in use providing for instance the A party address to the speech memory 15 via connection 22 during one half of the frame time and to the speech memory 16 via connection 25 during the other half of the frame time. For an intra-group connection the A party address is contained in a location of one of the two RAM's 23 and 24, and the B party address is contained in the corresponding location of the other RAM.

As described above the space switching stage 12 includes a control memory 18 for each matrix switch 17. The memory 18 is a $512 \times 9$ bit RAM, 5 bits being the address of the 32 input multiplexers, 2 extra bits being spare bits enabling expansion of the switch to 128 groups, one bit being a parity bit, and one bit being a plane select bit which is transmitted on connection 21 to join with the data on connection 19.

Initially each connection of the group is duplicated; that is, the connection is made in both planes and it is therefore necessary to decide at some point which plane will provide the speech data to be transmitted from the switch group on output connection 26. This is achieved by the plane select bits from the memories 18 in assocation with a logic unit 27. The plane select bit is written into the memory 18 of each plane by external control and the logic unit 27 selects which plane will provide the outgoing data depending upon the combination of plane select bits.

It should be apparent from the above description that the memory 20 provides the address of any location in speech memories 15 and 16 at respective times during a frame time but only has an address storage capability of one of the speech memories. Also, the memory 20 does not require any additional time slots for modifying information therein because modification can be done in all time slots during the operate part of the time slot.

Of course the invention is not intended for use only in the dual plane data switch described above as it can readily be adapted to other applications. Also, the control memory may be adapted to control more than two independent data memories.

We claim:

1. A control memory for addressing locations in incoming and outgoing data switching stages in a digital data switching network, said control memory comprising first and second random access memories each having an address storage capability equal to half the maximum number of locations in each of said data switching stages, means for generating successive binary address words, means for addressing simultaneously said random access memories with said address words, two selecting means, one being associated with the incoming and the other with the outgoing data switching stages for supplying alternatively the read out contents of one or the other of said random access memories to the data switching stage associated with the selecting means, and means for supplying the most significant bit of said address words to said selecting means, the value of said most significant bit determining from which of the random access memories the contents thereof should be supplied to the data switching stage associated with the selecting means.

2. A control memory as defined in claim 1 wherein said incoming and outgoing data switching stages are incoming and outgoing data memories respectively.

3. A control memory as defined in claim 2 wherein operation of said random access memories is divided into two phases; a read phase during which the contents of the random access memories are read cyclically for the purpose of presenting address data to said data memories; and an operate phase during which the contents of any location may be read or modified, in order to terminate existing connections, enable new connections or perform maintenance tests, said two phases of operation occurring consecutively within one time slot, thus enabling data in the random access memories to be accessed or modified during any time slot without reducing the number of time slots available for switching data through said switching network.

4. A control memory as defined in claim 3 wherein data read from each random access memory is presented to each of two multiplexers and said multiplexers being controlled by the most significant bit of a sequential address to the random access memories thus determining which random access memory output address is connected to the respective data memories.

5. A control memory as defined in claim 4 wherein said read and operate phases occur respectively, whilst a clock pulse for the control memory is high and low.

6. A control memory as defined in claim 5 wherein reclocking buffers are provided at the outputs of said multiplexers, said reclocking buffers extending the duration of the switch addresses to a full clock period.

* * * * *